United States Patent [19]

Williams, deceased et al.

[11] 4,183,294
[45] Jan. 15, 1980

[54] STONE FRUIT CUTTER

[75] Inventors: James A. Williams, deceased, late of Waikerie, Australia, by Annie M. Williams, trustee; Colin J. Williams, Waikerie, Australia

[73] Assignee: J.A. & A.M. Williams Pty. Ltd.

[21] Appl. No.: 874,861

[22] Filed: Feb. 2, 1978

[51] Int. Cl.² .......................... A23N 4/04; A23N 4/22
[52] U.S. Cl. .................................. 99/537; 99/552; 99/555; 198/410; 83/435; 83/435.2
[58] Field of Search ............... 99/537, 547, 548, 549, 99/552, 555; 83/425, 51, 435, 435.2; 198/410–412, 415

[56] References Cited

U.S. PATENT DOCUMENTS

| | | | |
|---|---|---|---|
| 1,524,886 | 2/1925 | Roberts | 99/552 |
| 1,915,447 | 6/1933 | Robbins | 99/548 |
| 2,455,072 | 11/1948 | Lindley, Jr. | 99/555 |
| 2,745,453 | 5/1956 | Perrelli et al. | |
| 2,906,307 | 9/1959 | Ciraolo | |
| 3,194,290 | 7/1965 | McClelland et al. | |
| 3,258,045 | 6/1966 | Mattos et al. | |
| 3,273,616 | 9/1966 | Peterson | 99/549 |
| 3,273,692 | 9/1966 | Peterson et al. | 99/555 |
| 3,496,978 | 2/1970 | Amori | 99/552 |

*Primary Examiner*—Harvey C. Hornsby
*Assistant Examiner*—Timothy F. Simone
*Attorney, Agent, or Firm*—Pearne, Gordon, Sessions

[57] ABSTRACT

A stone fruit cutting apparatus for slicing apricots, this apparatus having a pair of substantially vertical belts defining a channel to guide and carry the fruit therealong to the cutting position. The cutter comprises a pair of vertical disc cutters displaced one above the other to give an upper and lower cutter, so that during cutting the fruit is supported by the belts and rotated to produce a cut around its circumference to the depth of the stone.

10 Claims, 3 Drawing Figures

STONE FRUIT CUTTER

This invention relates to a stone fruit cutter and in particular it relates to a cutter for use with fruits such as apricots for which the machine has been specially designed but need not necessarily be limited to such use.

BACKGROUND OF INVENTION

In the cutting of stone fruit for canning or the like it is customary to cut the fruit around the stone so that the two halves of the fruit can be removed from the stone.

In the case of apricots the stone can be readily removed once the apricot has been halved as generally the stone is not attached to the flesh but even in cases where there is some attachment of the stone, provided the cut is correctly made to completely encircle the fruit and the cut extends right down to the stone, no problems in removing the stone are then encountered.

Various types of machines have been proposed heretofore for this purpose, such for instance as machines which have a pair of cups which engage the fruit to be cut and rotate it against a saw or cutting blade or the like.

With machines of this nature it is difficult to accurately position the fruit and also one of the essentials in cutting fruit is to ensure that there will be no bruising of the fruit such as when the fruit is incorrectly held in cups or the like.

The object of the present invention therefore, is to provide an improved machine which can successfully cut fruit such as apricots, and which can do this in a simple and effective manner.

SUMMARY OF INVENTION

Accordingly the present invention is for a stone fruit cutter including a pair of substantially vertical belts defining a channel to guide and carry the fruit therealong to pass the fruit between a pair of vertical disc cutters displaced one above the other to give an upper and lower cutter, so that during cutting the fruit is supported and rotated to produce a cut around its circumference to the depth of the stone.

It will be realised that the actual constructions of the invention can be considerably varied but so that the nature of the invention and the method of supporting and cutting can be fully appreciated, an embodiment will now be described to which the invention need not necessarily be limited.

DESCRIPTION OF THE PREFERRED EMBODIMENT

Figure 1:
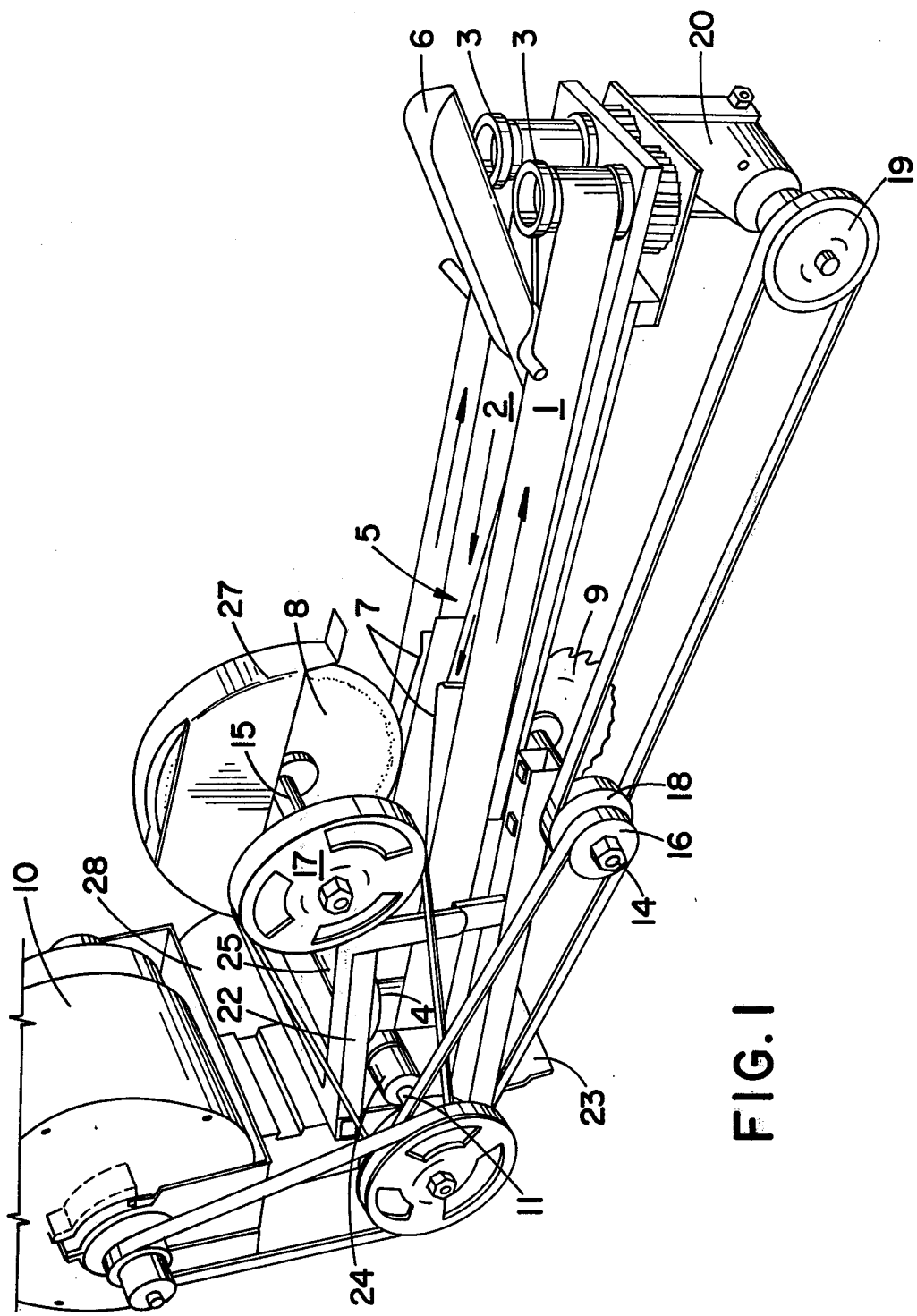
FIG. 1 is a general view of the cutter.
Figure 2:
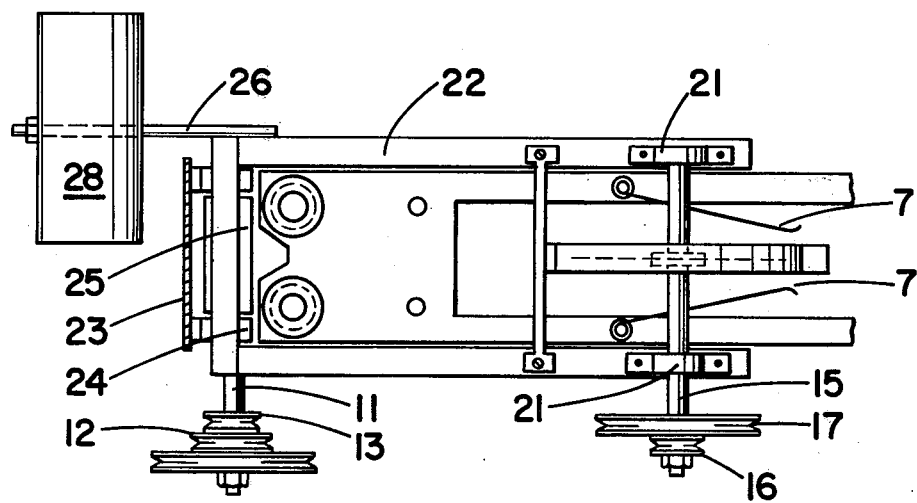
FIG. 2 is a plan view with a motor removed to more clearly view the invention.
Figure 3:
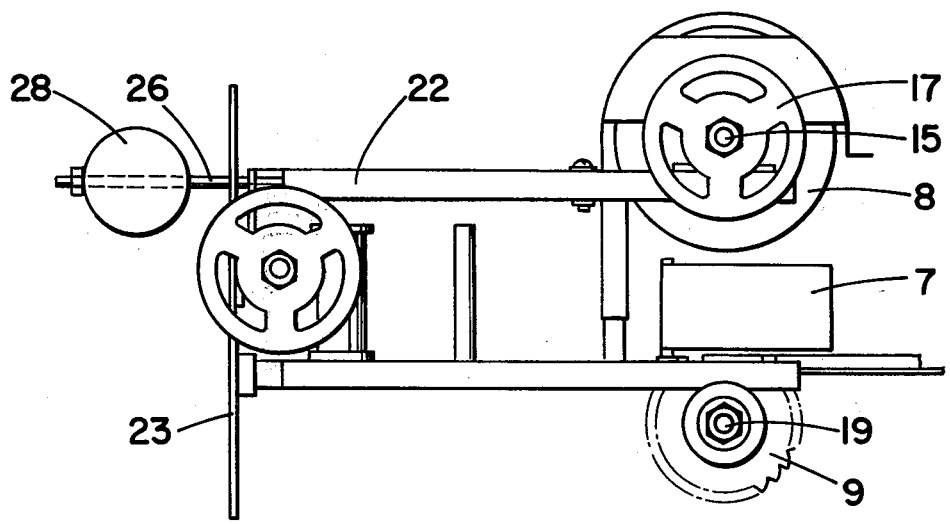
FIG. 3 is a side view thereof.

According to this embodiment a pair of belts 1, 2 are positioned side by side to pass around rollers 3, 4 at each end so that adjacent sides of the two belts are spaced apart a sufficient distance to form between them a channel 5 which is open at the top and the bottom, but this belt assembly has a chute 6 projecting between the belts 1, 2 at one end so that fruit can be fed down the chute to be engaged between the two belts 1, 2 and movement of the belts carries the fruit forward to the cutting locality.

At the cutting locality the belts 1, 2 are loaded inwardly by a pair of spring loaded guides 7 which move the two adjacent portions of the belt which form the channel between them towards each other, but the guides 7 because of their spring loading can move apart so that fruit of any size can be accommodated by the belt but will be correctly guided as it is moved by the belt under influence of the spring loaded guides.

At the locality of the guides 7 is positioned an upper cutter 8 and a lower cutter 9 which are arranged in the same plane, the upper cutter 8 preferably being in the form of a disc with a sharpened edge while the lower cutter 9 can also be in the form of a disc with a sharpened edge but is preferably scalloped or shaped around its periphery to give it a better grip on the fruit so that it can rotate the fruit when the stone of the fruit is in contact with the periphery of this bottom cutter.

The bottom cutter 9 is fixed in position but the top cutter 8 is movable towards or away from the bottom cutter but is counter weighted by a counter weight 28 in such a manner that when fruit passes between these two cutters, the cutters will be forced into the fruit from above and below to engage the stone and the fruit will then be rotated because the cutters rotate and a completely circular cut right around the fruit is made.

The lower cutter 9 preferably revolves in a direction such that it services to rotate the fruit but allows it to move in the direction in which it is carried by the belts, but the top cutter 8 preferably rotates in a counter direction to the movement of the fruit to give a highly effective cutting action.

The drive of the cutters 8, 9 can be taken from a motor 10 through a lay shaft 11 which has on it belt pulleys, one of these pulleys 12 being connected by means of the belt to a pulley 16 on the shaft 14 of the bottom cutter 9 while the other pulley 13 is connected by a belt to a pulley 17 on the shaft 15 of the top cutter 8, but the ratio of the pulley is such that the bottom cutter is driven at a higher rate of rotation than the top cutter or at least the arrangement of the cutters is such that there is a differential speed and preferably in opposite direction so far as the rotation of the cutters is concerned.

A second pulley 18 on the shaft 14 of the bottom cutter 9 connects by means of a belt to a pulley 19 on a gear box 20 which drives the pair of rollers 3 around which the belts pass, so that drive is given to the two belts 1, 2 in a direction such that the two nearer faces of the belts move in the same direction and at the same speed to ensure that the fruit is held in the channel 5 formed between the belts 1, 2 and is conveyed by the belts into the cutting locality where the fruit is still aligned to move in a plane medial to the belts but can be rotated by engagement of the fruit by the top and bottom cutters which as stated are differentially driven so far as their speed is concerned to ensure that while one which is preferably scalloped as said engages the stone and rotates it as well as urging it along the path defined by the belts the top cutter at the cutting point moves in the opposite direction so that it cuts the fruit effectively as it is rotated, the loading onto the stone of the two cutters being of course effected by the counter weight 28 as the top cutter is supported on an arm with a regulated loading to ensure that the cutters are urged towards each other to engage stones of different size but the one cutter can move away from the other if the stone is of a larger dimension and any irregularities in the sizes or in the shape of stones will thus be adequately catered for by a relative movement of the one cutter to the other.

The top cutter 8 with its shaft 15 is supported by bearings 21 on a frame 22 which frame is pivoted to the main frame 23 by being pivoted about the shaft 11. The frame 22 has bosses 24 attached thereto, the shaft 11 passing through the bosses 24 and also bearing boss 25 affixed to the main frame 23. Thus it will be seen that the frame 22 together with cutter 8, shaft 15, and pulley 17 can pivot about the shaft 11 without altering the tension in the belt connecting the pulleys.

An arm 26 is affixed as by welding to the frame 22, the arm having adjustably positioned thereon the counter weight 28, so that by suitably positioning the weight 28 on the arm 26, the correct weight or force can be applied to the upper cutter 8.

As previously stated the belts pass around spaced pulleys but the space between the belts preferably at the drive end has a chute projecting between the belts which chute distorts the belts at this locality to form a channel with a larger top and a narrower bottom so that the fruit will be correctly positioned preferably at about the centre of the upright widths of the belts and the fruit is thus correctly positioned and properly carried through the cutting zone where of course the belts have their effective portions urged towards each other by the spring loaded guides to ensure that the fruit is firmly located but because of the spring loading of the guides is still able to be rotated by the cutters to ensure that there is a cut fully around the circumference of the fruit.

As the fruit leaves the cutting locality a guide forces the fruit from between the belts and discharges it into a receptacle where the halved fruit and the stones can be separated.

Hoppers can also be provided for feeding of the fruit and these lead to the chutes which lead the fruit to between the belts, and a safety guard 27 on the upper cutter 8.

From the foregoing it will be realised that a simple and effective device is provided which will effectively cut stone fruit into halves and will do this in an economical manner without damage to the fruit.

We claim:

1. A stone fruit cutter including a pair of horizontally spaced substantially vertical belts, a stationary surface below said belt to define a channel open at the top and bottom to guide and carry the fruit therealong, a pair of vertical disc cutters displaced one above the other to provide an upper and lower cutter, so that during cutting the fruit is supported by the belts to convey the fruit between and pass said cutters and also rotate said fruit to produce a cut around its circumference to the depth of the stone, said fruit being fed into said channel by a chute which extends between and separates said belts at the inlet end to form said channel whereby fruit passing down said chute is fed into said channel.

2. A stone fruit cutter as defined in claim 1 wherein the cutters are rotated, the lower cutter being driven at a higher speed than the upper cutter.

3. A stone fruit cutter as defined in claim 2 wherein the lower cutter is scalloped to pass the fruit through the cutting zone.

4. A stone fruit cutter as defined in claim 2 wherein the cutters rotate in opposite directions to each other.

5. A stone fruit cutter as defined in claim 1 wherein the upper cutter can move towards and away from the lower cutter.

6. A stone fruit cutter as defined in claim 5 wherein the upper cutter is mounted on an upper frame pivoted to a frame of the lower cutter, the upper frame being counterbalanced so that the required cutting force is applied to the cutters.

7. A stone fruit cutter as defined in claim 1 wherein the belts are trained about parallel vertical pulleys, the belts being resiliently loaded toward each other by spring loaded guides in the region of the cutters.

8. A stone fruit cutter as defined in claim 1 wherein the belts and cutters are driven by an electric motor by a system of V-belts and pulleys.

9. A stone fruit cutter as set forth in claim 7, wherein the spring loaded guides cooperate with the belts to provide the sole support for the fruit during the cutting and rotating thereof by the disc cutters.

10. A stone fruit cutter as set forth in claim 9, wherein the belts are driven at the same speed.

* * * * *